US008122098B1

(12) United States Patent
Richardson et al.

(10) Patent No.: US 8,122,098 B1
(45) Date of Patent: *Feb. 21, 2012

(54) MANAGING CONTENT DELIVERY NETWORK SERVICE PROVIDERS BY A CONTENT BROKER

(75) Inventors: David R. Richardson, Seattle, WA (US); Bradley E. Marshall, Bainbridge Island, WA (US); Swaminathan Sivasubramanian, Seattle, WA (US); Tal Saraf, Seattle, WA (US); Imran S. Patel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 468 days.

This patent is subject to a terminal disclaimer.

(21) Appl. No.: 12/272,715

(22) Filed: Nov. 17, 2008

(51) Int. Cl.
*G06F 15/16* (2006.01)
(52) U.S. Cl. ................... 709/217; 709/226; 709/223
(58) Field of Classification Search .......... 709/217–219, 709/226, 223–224
See application file for complete search history.

(56) References Cited

U.S. PATENT DOCUMENTS

| 5,341,477 | A  | 8/1994  | Pitkin et al.    |
| 5,611,049 | A  | 3/1997  | Pitts            |
| 5,774,660 | A  | 6/1998  | Brendel et al.   |
| 5,892,914 | A  | 4/1999  | Pitts            |
| 6,016,512 | A  | 1/2000  | Huitema          |
| 6,026,452 | A  | 2/2000  | Pitts            |
| 6,052,718 | A  | 4/2000  | Gifford          |
| 6,085,234 | A  | 7/2000  | Pitts et al.     |
| 6,098,096 | A  | 8/2000  | Tsirigotis et al.|
| 6,108,703 | A  | 8/2000  | Leighton et al.  |
| 6,182,111 | B1 | 1/2001  | Inohara et al.   |
| 6,205,475 | B1 | 3/2001  | Pitts            |
| 6,286,084 | B1 | 9/2001  | Wexler et al.    |
| 6,304,913 | B1 | 10/2001 | Rune             |
| 6,351,743 | B1 | 2/2002  | DeArdo et al.    |
| 6,351,775 | B1 | 2/2002  | Yu               |
| 6,363,411 | B1 | 3/2002  | Dugan et al.     |
| 6,366,952 | B2 | 4/2002  | Pitts            |
| 6,457,047 | B1 | 9/2002  | Chandra et al.   |
| 6,484,143 | B1 | 11/2002 | Swildens et al.  |
| 6,505,241 | B2 | 1/2003  | Pitts            |
| 6,553,413 | B1 | 4/2003  | Leighton et al.  |
| 6,654,807 | B2 | 11/2003 | Farber et al.    |
| 6,678,791 | B1 | 1/2004  | Jacobs et al.    |
| 6,694,358 | B1 | 2/2004  | Swildens et al.  |
| 6,732,237 | B1 | 5/2004  | Jacobs et al.    |
| 6,754,699 | B2 | 6/2004  | Swildens et al.  |
| 6,754,706 | B1 | 6/2004  | Swildens et al.  |

(Continued)

OTHER PUBLICATIONS

Al-Fares, M. et al., A Scalable, Commodity Data Center Network Architecture, SIGCOMM '08 Proceedings, Aug. 17, 2008, pp. 63-74, 66-68, 70-71, Seattle, WA.

(Continued)

*Primary Examiner* — Abdullahi Salad
(74) *Attorney, Agent, or Firm* — Knobbe, Martens, Olson & Bear

(57) ABSTRACT

A system, method, and computer readable medium for managing network storage provider and CDN service providers are provided. A content broker component obtains client computing device requests for content provided by a content provider. The content broker processes the client computing device requests and determines whether a subsequent request for the resource should be directed to a network storage provider or a CDN service provider as a function of the updated or processed by the content broker.

24 Claims, 7 Drawing Sheets

U.S. PATENT DOCUMENTS

| | | |
|---|---|---|
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,981,017 B1 | 12/2005 | Kasriel et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,058,706 B1 | 6/2006 | Iyer et al. |
| 7,065,496 B2 | 6/2006 | Subbloie et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,146,560 B2 * | 12/2006 | Dang et al. .................. 715/204 |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,240,100 B1 | 7/2007 | Wein et al. |
| 7,260,598 B1 | 8/2007 | Liskov et al. |
| 7,269,784 B1 | 9/2007 | Kasriel et al. |
| 7,310,686 B2 | 12/2007 | Uysal |
| 7,320,131 B1 * | 1/2008 | O'Toole, Jr. .................. 718/104 |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 * | 3/2009 | Menditto et al. .............. 709/217 |
| 7,548,947 B2 | 6/2009 | Kasriel et al. |
| 7,552,235 B2 | 6/2009 | Chase et al. |
| 7,624,169 B2 * | 11/2009 | Lisiecki et al. ............... 709/223 |
| 7,653,700 B1 | 1/2010 | Bahl et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,739,400 B2 * | 6/2010 | Lindbo et al. ................. 709/238 |
| 7,747,720 B2 | 6/2010 | Toebes et al. |
| 7,756,913 B1 | 7/2010 | Day |
| 7,761,572 B1 | 7/2010 | Auerbach |
| 7,774,342 B1 | 8/2010 | Virdy |
| 7,792,989 B2 | 9/2010 | Toebes et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,865,594 B1 | 1/2011 | Baumback et al. |
| 7,912,921 B2 | 3/2011 | O'Rourke et al. |
| 7,925,782 B2 | 4/2011 | Sivasubramanian et al. |
| 7,962,597 B2 | 6/2011 | Richardson et al. |
| 7,991,910 B2 | 8/2011 | Richardson et al. |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0078233 A1 | 6/2002 | Biliris et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0101836 A1 | 8/2002 | Dorenbosch |
| 2002/0129123 A1 | 9/2002 | Johnson et al. |
| 2002/0138286 A1 | 9/2002 | Engstrom |
| 2002/0147770 A1 | 10/2002 | Tang |
| 2002/0188722 A1 | 12/2002 | Banerjee et al. |
| 2002/0194382 A1 | 12/2002 | Kausik et al. |
| 2003/0002484 A1 | 1/2003 | Freedman |
| 2003/0009591 A1 | 1/2003 | Hayball et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0101278 A1 | 5/2003 | Garcia-Luna-Aceves et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145066 A1 | 7/2003 | Okada et al. |
| 2003/0149581 A1 * | 8/2003 | Chaudhri et al. .................. 705/1 |
| 2003/0163722 A1 | 8/2003 | Anderson, IV |
| 2003/0172183 A1 | 9/2003 | Anderson, IV et al. |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0236700 A1 | 12/2003 | Arning et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0044791 A1 | 3/2004 | Pouzzner |
| 2004/0049579 A1 | 3/2004 | Ims et al. |
| 2004/0073867 A1 | 4/2004 | Kausik et al. |
| 2004/0078487 A1 | 4/2004 | Cernohous et al. |
| 2004/0083307 A1 * | 4/2004 | Uysal ........................... 709/246 |
| 2004/0117455 A1 | 6/2004 | Kaminsky et al. |
| 2004/0128344 A1 | 7/2004 | Trossen |
| 2004/0172466 A1 | 9/2004 | Douglas et al. |
| 2004/0203630 A1 | 10/2004 | Wang |
| 2004/0205149 A1 | 10/2004 | Dillon et al. |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0038967 A1 * | 2/2005 | Umbehocker et al. ........ 711/154 |
| 2005/0044270 A1 | 2/2005 | Grove et al. |
| 2005/0108169 A1 | 5/2005 | Balasubramanian et al. |
| 2005/0132083 A1 | 6/2005 | Raciborski et al. |
| 2005/0188073 A1 | 8/2005 | Nakamichi et al. |
| 2005/0192008 A1 | 9/2005 | Desai et al. |
| 2005/0232165 A1 | 10/2005 | Brawn et al. |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2006/0013158 A1 | 1/2006 | Ahuja et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0064500 A1 | 3/2006 | Roth et al. |
| 2006/0074750 A1 | 4/2006 | Clark et al. |
| 2006/0075139 A1 | 4/2006 | Jungck |
| 2006/0083165 A1 | 4/2006 | McLane et al. |
| 2006/0112176 A1 | 5/2006 | Liu et al. |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0190605 A1 | 8/2006 | Franz et al. |
| 2006/0193247 A1 | 8/2006 | Naseh et al. |
| 2006/0209701 A1 | 9/2006 | Zhang et al. |
| 2006/0218304 A1 | 9/2006 | Mukherjee et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0265508 A1 | 11/2006 | Angel et al. |
| 2006/0265516 A1 | 11/2006 | Schilling |
| 2006/0265720 A1 | 11/2006 | Cai et al. |

| | | | |
|---|---|---|---|
| 2006/0271641 A1 | 11/2006 | Stavrakos et al. | |
| 2006/0282522 A1 | 12/2006 | Lewin et al. | |
| 2007/0005689 A1 | 1/2007 | Leighton et al. | |
| 2007/0005892 A1 | 1/2007 | Mullender et al. | |
| 2007/0014241 A1 | 1/2007 | Banerjee et al. | |
| 2007/0041393 A1 | 2/2007 | Westhead et al. | |
| 2007/0050522 A1 | 3/2007 | Grove et al. | |
| 2007/0086429 A1 | 4/2007 | Lawrence et al. | |
| 2007/0101377 A1 | 5/2007 | Six et al. | |
| 2007/0118667 A1 | 5/2007 | McCarthy et al. | |
| 2007/0118668 A1 | 5/2007 | McCarthy et al. | |
| 2007/0174426 A1 | 7/2007 | Swildens et al. | |
| 2007/0183342 A1 | 8/2007 | Wong et al. | |
| 2007/0208737 A1 | 9/2007 | Li et al. | |
| 2007/0244964 A1 | 10/2007 | Challenger et al. | |
| 2007/0266113 A1 | 11/2007 | Koopmans et al. | |
| 2008/0005057 A1 | 1/2008 | Ozzie et al. | |
| 2008/0008089 A1 | 1/2008 | Bornstein et al. | |
| 2008/0046596 A1 | 2/2008 | Afergan et al. | |
| 2008/0065724 A1 | 3/2008 | Seed et al. | |
| 2008/0071987 A1 | 3/2008 | Karn et al. | |
| 2008/0072264 A1 | 3/2008 | Crayford | |
| 2008/0086559 A1 | 4/2008 | Davis et al. | |
| 2008/0086574 A1 | 4/2008 | Raciborski et al. | |
| 2008/0147866 A1 | 6/2008 | Stolorz et al. | |
| 2008/0155061 A1 | 6/2008 | Afergan et al. | |
| 2008/0155614 A1 | 6/2008 | Cooper et al. | |
| 2008/0162667 A1 | 7/2008 | Verma et al. | |
| 2008/0172488 A1 | 7/2008 | Jawahar et al. | |
| 2008/0183721 A1 | 7/2008 | Bhogal et al. | |
| 2008/0215755 A1 | 9/2008 | Farber et al. | |
| 2008/0228920 A1 | 9/2008 | Souders et al. | |
| 2008/0235400 A1 | 9/2008 | Slocombe et al. | |
| 2008/0275772 A1 | 11/2008 | Suryanarayana et al. | |
| 2008/0281950 A1 | 11/2008 | Wald et al. | |
| 2008/0288722 A1 | 11/2008 | Lecoq et al. | |
| 2008/0301670 A1 | 12/2008 | Gouge et al. | |
| 2008/0319862 A1 | 12/2008 | Golan et al. | |
| 2009/0013063 A1 | 1/2009 | Soman | |
| 2009/0016236 A1 | 1/2009 | Alcala et al. | |
| 2009/0049098 A1 | 2/2009 | Pickelsimer et al. | |
| 2009/0070533 A1 | 3/2009 | Elazary et al. | |
| 2009/0086741 A1 | 4/2009 | Zhang | |
| 2009/0103707 A1 | 4/2009 | McGary et al. | |
| 2009/0106381 A1 | 4/2009 | Kasriel et al. | |
| 2009/0112703 A1 | 4/2009 | Brown | |
| 2009/0125934 A1 | 5/2009 | Jones et al. | |
| 2009/0144412 A1 | 6/2009 | Ferguson et al. | |
| 2009/0157850 A1 | 6/2009 | Gagliardi et al. | |
| 2009/0164331 A1 | 6/2009 | Bishop et al. | |
| 2009/0177667 A1 | 7/2009 | Ramos et al. | |
| 2009/0182815 A1 | 7/2009 | Czechowski, III et al. | |
| 2009/0182945 A1 | 7/2009 | Aviles et al. | |
| 2009/0204682 A1 | 8/2009 | Jeyaseelan et al. | |
| 2009/0210549 A1 | 8/2009 | Hudson et al. | |
| 2009/0248786 A1 | 10/2009 | Richardson et al. | |
| 2009/0248787 A1 | 10/2009 | Sivasubramanian et al. | |
| 2009/0248852 A1 | 10/2009 | Fuhrmann et al. | |
| 2009/0248858 A1 | 10/2009 | Sivasubramanian et al. | |
| 2009/0248893 A1 | 10/2009 | Richardson et al. | |
| 2009/0259971 A1 | 10/2009 | Rankine et al. | |
| 2009/0271577 A1 | 10/2009 | Campana et al. | |
| 2009/0271730 A1 | 10/2009 | Rose et al. | |
| 2009/0279444 A1 | 11/2009 | Ravindran et al. | |
| 2009/0287750 A1 | 11/2009 | Banavar et al. | |
| 2009/0307307 A1 | 12/2009 | Igarashi | |
| 2009/0327517 A1 | 12/2009 | Sivasubramanian et al. | |
| 2010/0005175 A1 | 1/2010 | Swildens et al. | |
| 2010/0011061 A1 | 1/2010 | Hudson et al. | |
| 2010/0023601 A1 | 1/2010 | Lewin et al. | |
| 2010/0030662 A1 | 2/2010 | Klein | |
| 2010/0036944 A1 | 2/2010 | Douglis et al. | |
| 2010/0100629 A1 | 4/2010 | Raciborski et al. | |
| 2010/0111059 A1 | 5/2010 | Bappu et al. | |
| 2010/0122069 A1 | 5/2010 | Gonion | |
| 2010/0125673 A1 | 5/2010 | Richardson et al. | |
| 2010/0125675 A1 | 5/2010 | Richardson et al. | |
| 2010/0217801 A1 | 8/2010 | Leighton et al. | |
| 2010/0226372 A1 | 9/2010 | Watanabe | |
| 2010/0257566 A1 | 10/2010 | Matila | |
| 2010/0332595 A1 | 12/2010 | Fullagar et al. | |

OTHER PUBLICATIONS

Greenberg, A. et al., Networking the Cloud, 29th IEEE International Conference on Distributed Computing Systems (ICDCS 2009), Jun. 22-26, 2009 [online] retrieved from the Internet on Mar. 10, 2011: http://www.cse.ohio-state.edu/icdcs2009/Keynote_files/greenberg-keynote.pdf, pp. 1-45.

Greenberg, A. et al., Towards a Next Generation Data Center Architecture: Scalability and Commoditization, SIGCOMM '08: Proceedings of the 2008 SIGCOMM Conference and Co-Located Workshops NSDR '08, WOSN '08, MOBIARCH '08, NETECON '08, & Presto '08, Seattle, WA, Aug. 17-28, 2008, ACM, Aug. 17, 2008, pp. 57-62, New York, NY.

Greenberg, A. et al., VL2: A scalable and flexible data center network, SIGCOMM '09, Proceedings of the ACM SIGCOMM 2009 Conference on Data Communication, Aug. 17, 2009, vol. 39, Issue 4, pp. 51-62.

Mysore, R,N. et al., Portland: A scalable fault-tolerant layer 2 data center network fabric, SIGCOMM '09, Proceedings of the ACM SIGCOMM 2009 Conference on Data Communication, Aug. 17, 2009, pp. 39-50.

* cited by examiner

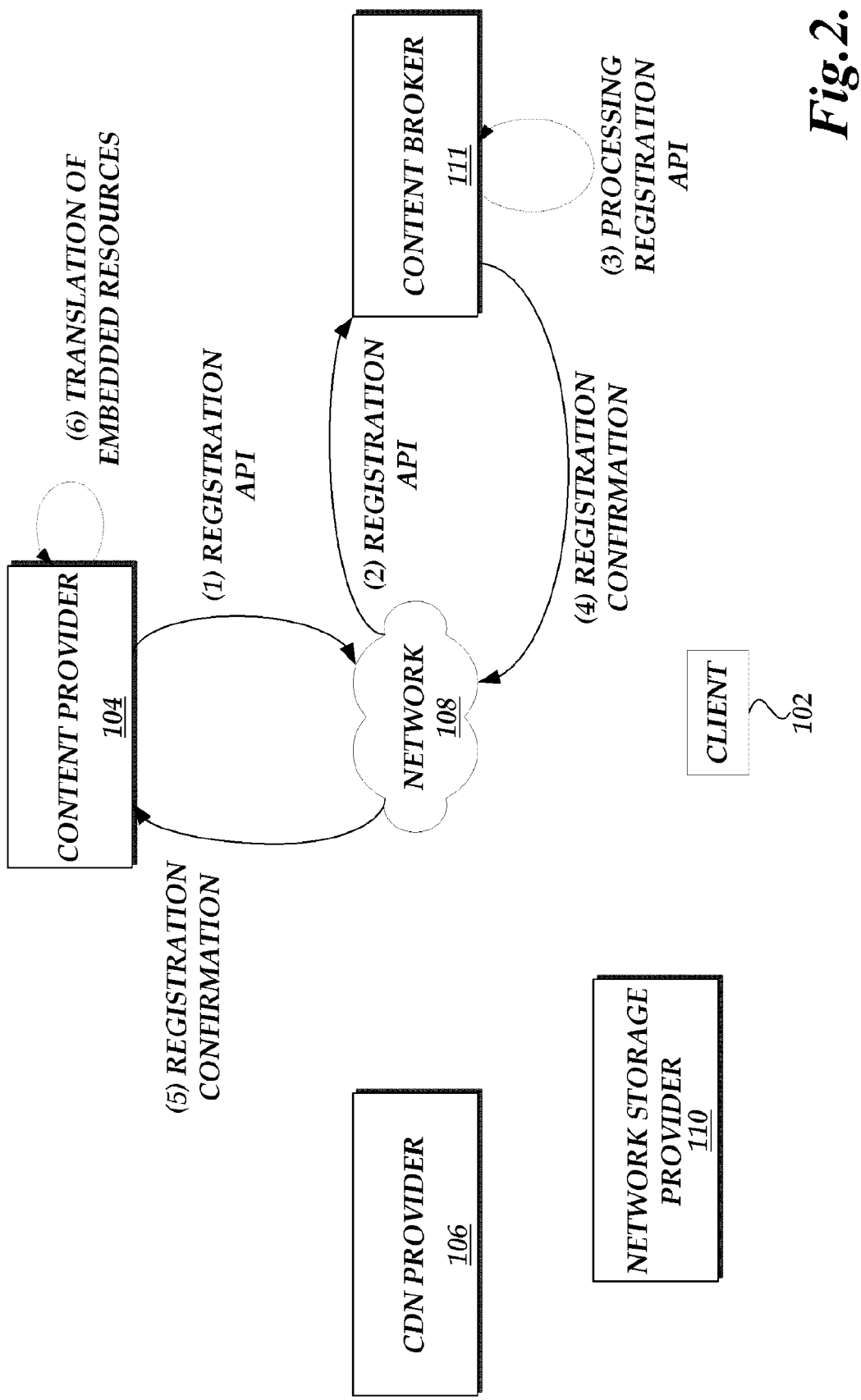

MANAGING CONTENT DELIVERY NETWORK SERVICE PROVIDERS BY A CONTENT BROKER

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintain a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a block diagram of the content delivery environment of FIG. 1 illustrating the registration of a content provider with a content broker;

DETAILED DESCRIPTION

Generally described, the present disclosure is directed to delivery of one or more resources associated with a content provider by selecting from available storage service providers and content delivery network ("CDN") service providers. Specifically, aspects of the disclosure will be described with regard to the management of resource delivery by a content broker component on behalf of a content provider as a function of request processing criteria. In one aspect, the content broker can automatically direct client computing device requests for a resource to a selected service provider (e.g., a selected network storage provider or a selected CDN service provider) as a function of request processing criteria. In another aspect, the content broker can provide recommendations to the content provider regarding the selected network storage provider or CDN service provider.

In an illustrative embodiment, the request processing criteria can correspond to a financial cost attributed to the content provider for delivery of requested resources by the network storage provider or a CDN service provider. The request processing criteria can also correspond to quality of service characteristics associated with the delivery of requested resources by a network storage provider or CDN service provider including, but not limited to a volume of client computing device resource requests made to the network storage provider, available communication network bandwidth or communication network bandwidth utilization, measured or estimated latencies, error rates or counts, and the like. Still further, the request processing criteria can correspond to content provider or client computing device specified information, such as end user specified feedback. Although various aspects of the disclosure will be described with regard to illustrative examples and embodiments, one skilled in the art will appreciate that the disclosed embodiments and examples should not be construed as limiting.

Figure 1:
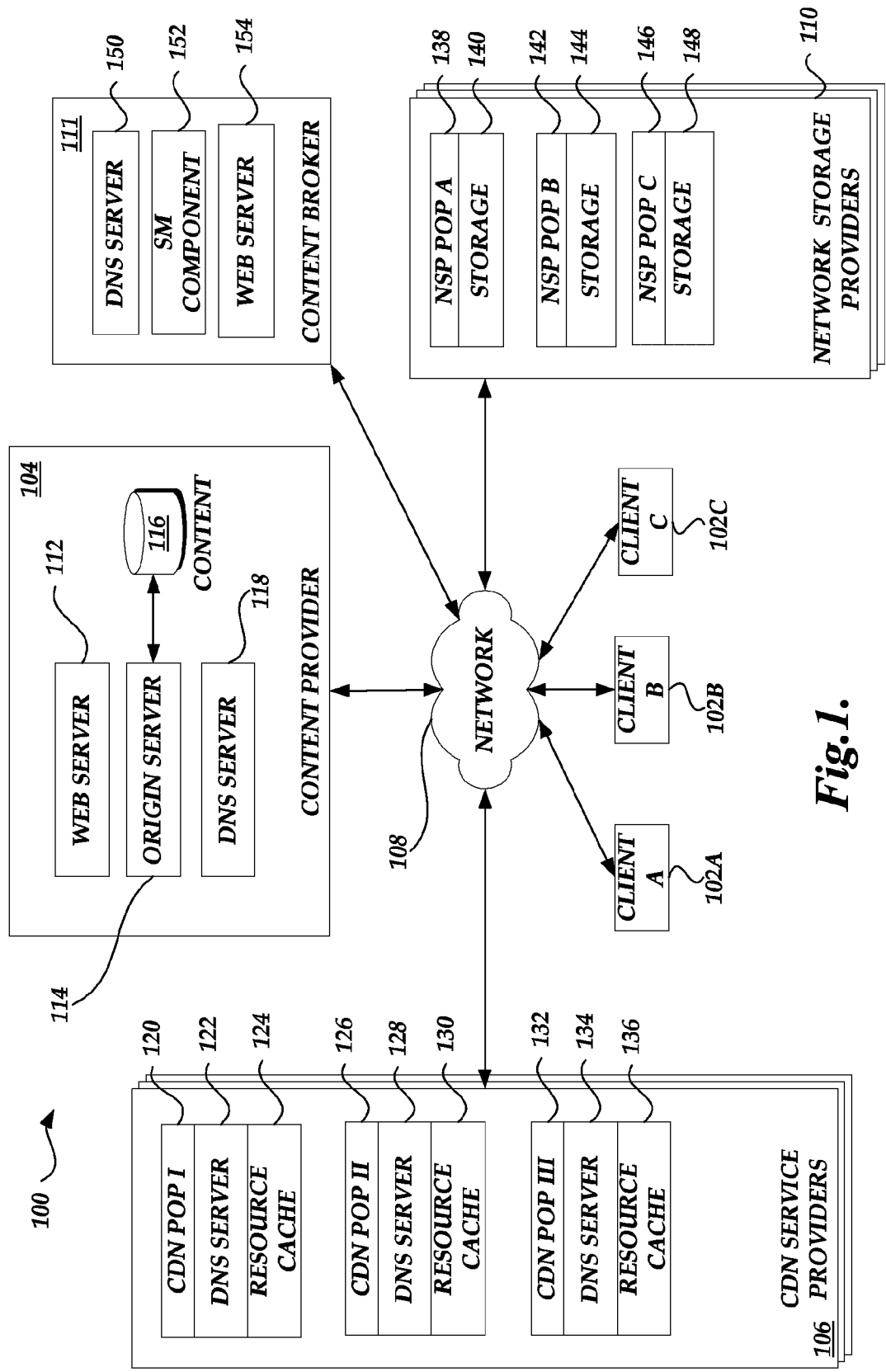
FIG. 1 is a block diagram illustrative of content delivery environment including a number of client computing devices, a content provider, a network storage provider, a content delivery network service provider, and a content broker.

FIG. 1 is a block diagram illustrative of content delivery environment 100 for the managing registration of content with one or more service providers and subsequent processing of content requests. As illustrated in FIG. 1, the content delivery environment 100 includes a number of client computing devices 102 (generally referred to as clients) for requesting content from a content provider, a content broker 111, one or more network storage providers 110, and/or one or more CDN service providers 106. In an illustrative embodiment, the client computing devices 102 can correspond to a wide variety of computing devices including personal computing devices, laptop computing devices, handheld computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS nameserver, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS nameservers, and the like. For example, as further illustrated in FIG. 1, the content provider 104 can be associated with one or more DNS nameserver components 118 that are operative to receive DNS queries related to registered domain names associated with the content provider. The one or more DNS nameservers can be authoritative to resolve client computing device DNS queries corresponding to the registered domain names of the content provider 104. A DNS nameserver component is considered to be authoritative to a DNS query if the DNS nameserver can resolve the query by providing a responsive IP address. Additionally, the content provider 104 may include multiple components or eliminate some of the components altogether, such as origin server 114.

With continued reference to FIG. 1, the content delivery environment 100 can further include one or more CDN service providers 106 in communication with the one or more client computing devices 102, the content provider 104, the content broker 111, and the one or more network storage providers 110 via the communication network 108. Each CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a DNS component 122, 128, 134 made up of a number of DNS nameserver computing devices for resolving DNS queries from the client computers 102. Each POP 120, 126, 132 also includes a resource cache component 124, 130, 136 made up of a number of cache server computing devices for storing resources from content providers, content brokers, or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include one or more network storage providers 110 in communication with the one or more client computing devices 102, the one or more CDN service providers 106, the content broker 111, and the content provider 104 via the communication network 108. Each network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142, 146 that correspond to nodes on the communication network 108. Each NSP POP 138, 142, 146 includes a storage component 140, 144, 148 made up of a number of storage devices for storing resources from content providers or content brokers which will be processed by the network storage provider 110 and transmitted to various client computers. The storage components 140, 144, 148 may further include additional software and/or hardware components that facilitate communications including, but not limited to, load balancing or load sharing software/hardware components.

In an illustrative embodiment, the storage components 140, 144, 148 are considered to be logically grouped, regardless of whether the components, or portions of the components, are physically separate. Additionally, although the NSP POPs 138, 142, 146 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such as additional computing devices for administration of content and resources, DNS nameservers, and the like. For example, the network storage provider 110 can be associated with one or more DNS nameserver components that are operative to receive DNS queries related to registered domain names associated with the network storage provider 110. The one or more DNS nameservers can be authoritative to resolve client computing device DNS queries corresponding to the registered domain names of the network storage provider 110. As similarly set forth above, a DNS nameserver component is considered to be authoritative to a DNS query if the DNS nameserver can resolve the query by providing a responsive IP address.

With further continued reference to FIG. 1, the content delivery environment 100 can also include a content broker 111 in communication with the one or more client computing devices 102, the one or more CDN service providers 106, the one or more network storage providers 110, and the content provider 104 via the communication network 108. The content broker 111 illustrated in FIG. 1 also corresponds to a logical association of one or more computing devices associated with a content broker. Specifically, the content broker 111 can include a web server component 154 corresponding to one or more server computing devices for obtaining and processing requests for content (such as Web pages) from the client computing devices 102 in embodiments in which the content broker provides original responsive content (e.g., Web pages) on behalf of the content provider, such as in the form of original hypertext markup language ("HTML") files. The content broker 111 can further include a storage management ("SM") component 152 for monitoring requests for resources and selecting one or more service providers (e.g., a selected network storage provider 110 or a selected CDN service provider 106) to process subsequent client computing device requests for the resources. The content broker 111 can also utilize the SM component 152 to provide selected service provider recommendations to the content provider(s) 104, such as via a Web service or other interface.

One skilled in the relevant art will appreciate that the content broker 111 can be associated with various additional computing resources, such additional computing devices for administration of content and resources, DNS nameservers, and the like. For example, as further illustrated in FIG. 1, the content broker 111 can be associated with one or more DNS nameserver components 150 that are operative to receive DNS queries related to registered domain names associated with the content broker 111. As will be further described below, the one or more DNS nameserver components 150 can be authoritative to resolve client computing device DNS queries corresponding to the registered domain names of the content broker 111. As similarly set forth above, a DNS nameserver component is considered to be authoritative to a DNS query if the DNS nameserver can resolve the query by providing a responsive IP address.

Even further, one skilled in the relevant art will appreciate that the components of the network storage provider 110, the CDN service provider 106, and the content broker 111 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-4B, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, an illustrative interaction for registration of a content provider 104 with the content broker 111 will be described. As illustrated in FIG. 2, the content broker content registration process begins with registration of the content provider 104 with the content broker 111. In an illustrative embodiment, the content provider 104 utilizes a registration application program interface ("API") to register with the content broker 111 such that the content broker 111 can facilitate use of one or more service providers, such as CDN service provider 106 or network storage provider 110, to provide content on behalf of the content provider 104.

In one embodiment, the content provider 104 may also request that the content broker 111 provide content on its behalf, especially when the content provider 104 does not have its own DNS component. In this embodiment, the content provider 104 may request the content broker 111 to provide original responsive content on behalf of the content provider, such as Web pages in the form of HTML files. The registration API can also include the identification of the origin server 114 of the content provider 104 that may provide requested resources, such as embedded resources, to the service providers 106 and 110. In addition or alternatively, the registration API can include the content to be stored and/or provided by the service providers 106 and/or 110 on behalf of the content provider 104. In one embodiment, the content broker 111 may facilitate using the network storage provider 110 as an origin server for the content provider 104.

One skilled in the relevant art will appreciate that upon registration of the content with the content broker 111, the content provider 104 can begin to direct requests for content from client computing devices 102 to the content broker 111. Specifically, in accordance with DNS routing principles, and as will be described in further detail below, a client computing device request corresponding to a resource identifier would initially be directed to a content broker domain (e.g., a domain registered to, or otherwise associated with the content broker 111) and would then be directed toward a domain associated with a selected service provider, such as CDN service provider 106 or network storage provider 110. Alternatively, based on recommendations provided by the content broker 110, the content provider 104 can direct (or have directed) requests to the selected service provider by translating the resource identifier directly to a domain associated with the selected service provider.

With continued reference to FIG. 2, upon receiving the registration API, the content broker 111 obtains and processes the content provider registration information. In an illustrative embodiment, the content broker 111 can then generate additional information that will be used by the client computing devices 102 as part of the content requests. The additional information can include, without limitation, content provider identifiers, such as content provider identification codes, service provider identifiers, such as service provider identification codes, content broker identifiers, such as content broker specified identification codes, executable code for processing resource identifiers, such as script-based instructions, and the like. One skilled in the relevant art will appreciate that various types of additional information may be generated by the content broker 111 and that the additional information may be embodied in any one of a variety of formats.

In an embodiment in which the content broker 111 facilitates that selection of a service provider, the content broker 111 returns an identification of applicable domains for the content broker (unless it has been previously provided) and any additional information to the content provider 104. In turn, the content provider 104 can then process the stored content with content broker specific information. In one example, as illustrated in FIG. 2, the content provider 104 translates resource identifiers originally directed toward a domain of the origin server 114 to a domain corresponding to the content broker 111. The translated URLs are embedded into requested content in a manner such that DNS queries for the translated URLs will be processed by a DNS nameserver, such as DNS nameserver 150, corresponding to the content broker 111 and not a DNS nameserver corresponding to the content provider 104, such as DNS nameserver 118.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to the content broker 111. In one embodiment, the modified URL identifies the domain of the content broker 111 (e.g., "contentbroker.com"), the same name of the resource to be requested (e.g., "resource.xxx") and the same path where the resource will be found (e.g., "path"). Additionally, the modified URL can include additional processing information (e.g., "additional information"). The modified URL would have the form of:

http://additional information.contentbroker.com/path/resource.xxx

In another embodiment, the information associated with the content broker 111 is included in the modified URL, such as through prepending or other techniques, such that the translated URL can maintain all of the information associated with the original URL. In this embodiment, the translated URL would have the form of:

http://additional information.contentbroker.com/www.contentprovider.com/path/resource.xxx In an illustrative embodiment, the content broker 111 can facilitate the registration of one or more network storage providers 110 and one or more CDN service providers 106 to host content or provide content on behalf of the content provider 104. In one example, the content broker 111 generates (or causes the generation) of various user interfaces for facilitating the selection and registration of the one or more network storage providers 110 and one or more CDN service providers 106. In another example, the content broker 111 can utilize various APIs to facilitate the selection and registration of the one or more network storage providers 110 and one or more CDN service providers 106. The APIs may be processed by the content provider 104 and the content broker 111 such that the of the one or more network storage providers 110 and one or more CDN service providers 106 can be completed without requiring additional human interaction, such as via a system administrator. Illustrative systems, methods and interfaces for facilitating the selection and registration of one or more network storage providers 110 and one or more CDN service providers 106 by a content broker 111 are described in commonly assigned and co-pending U.S. patent application Ser. No. 12/272,641, entitled Storage Provider Registration by a Content Broker, filed Nov. 17, 2008, which is incorporated in its entirety by reference herein.

Figure 3A:
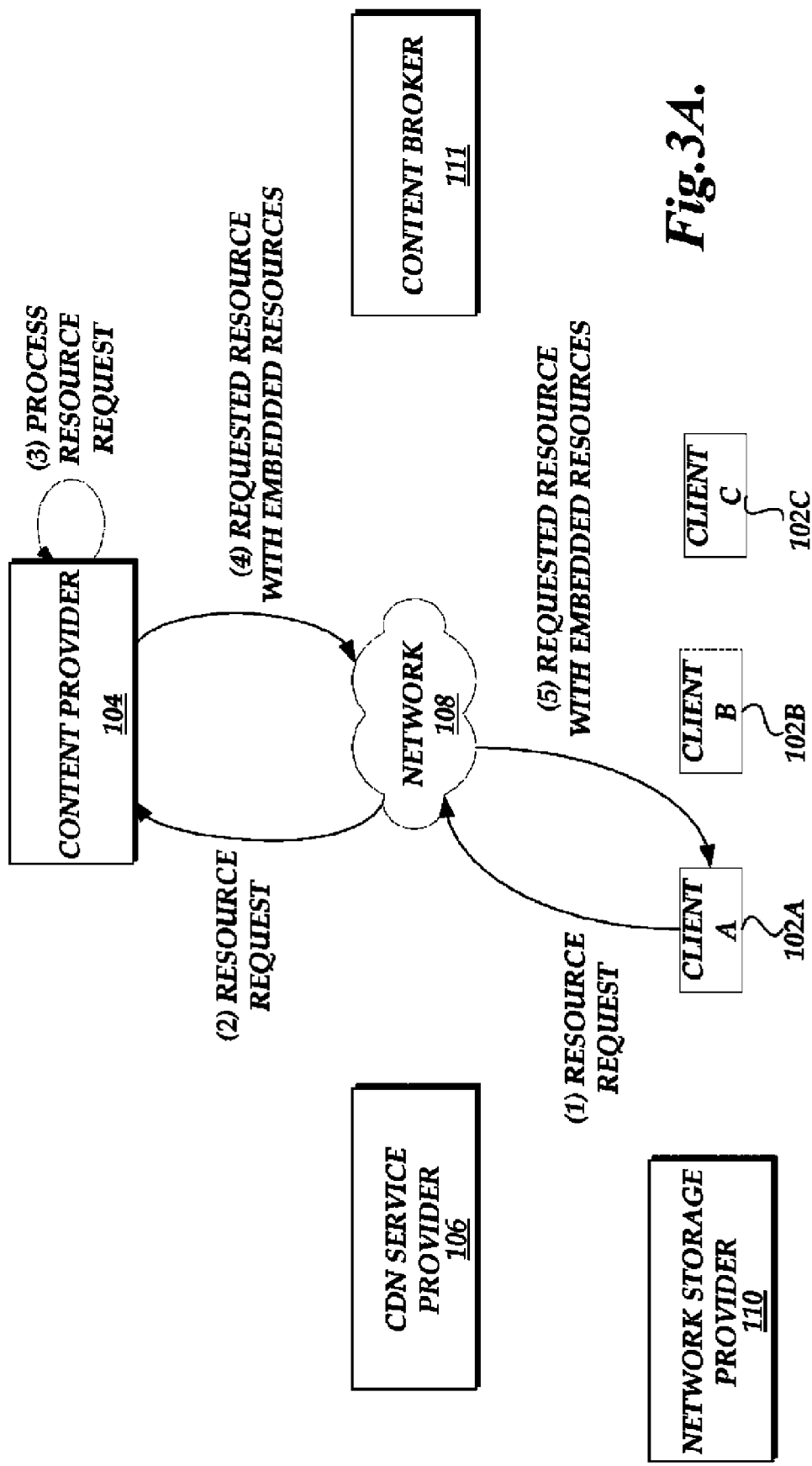
FIG. 3A is a block diagram of the content delivery environment of FIG. 1 illustrating the generation and processing of a resource request by a client computing device to a content provider.

With reference now to FIG. 3A, after completion of the registration and translation processes illustrated in FIG. 2, a first client computing device 102A subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies and transmits the appropriate responsive content to the client computing device 102A. In an illustrative embodiment, the requested content can correspond to a Web page that is displayed on the client computing device 102A via the processing of information, such as HTML, XML, and the like. The requested content can also include a number of embedded resource identifiers, described above, that corresponds to resource objects that should be obtained by the client computing device 102A as part of the processing of the requested content. The embedded resource identifiers can be generally referred to as original resource identifiers or original URLs.

Figure 3B:
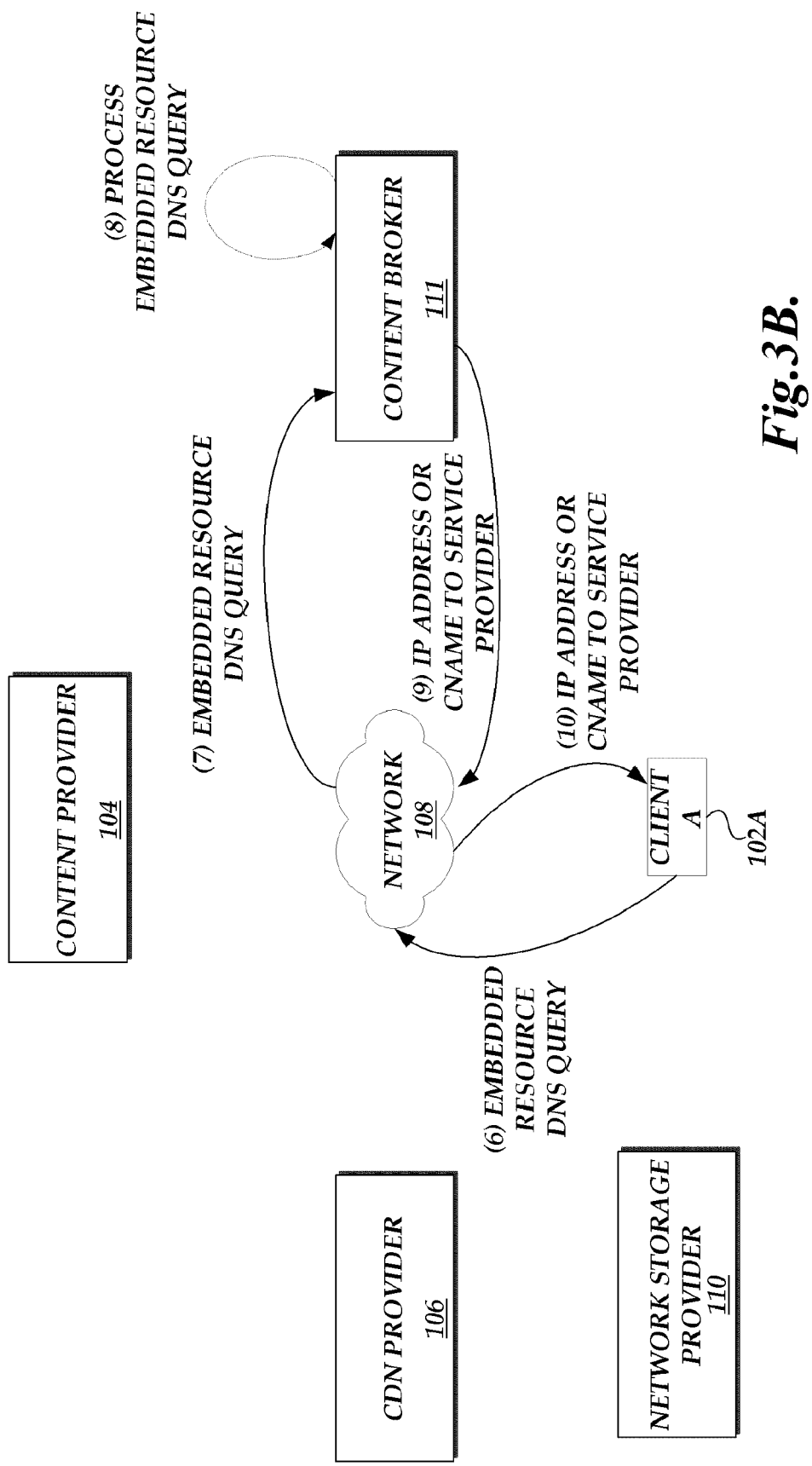
FIG. 3B is a block diagram of the content delivery environment of FIG. 1 illustrating the processing of a resource request by a content broker.

With reference now to FIG. 3B, upon receipt of the requested content, the client computing device 102A, such as through a browser software application, begins processing any of the markup code included in the content and attempts to acquire the resources identified by the embedded resource identifiers. Accordingly, the first step in acquiring the content corresponds to the issuance, by the client computing device 102A (through its local DNS resolver), of a DNS query for the original URL resource identifier that results in the identification of a DNS nameserver authoritative to the "." and the "com" portions of the translated URL. Pursuant to an embodiment in which the translated URLs are directed to the content broker 111, after processing the "." and "com" portions of the embedded URL, the client computing device 102A then issues a DNS query for the resource URL that results in ".contentbroker" portion of the embedded URL. The issuance of DNS queries corresponding to the "." and the "com" portions of a URL are well known and have not been illustrated.

In an illustrative embodiment, the identification of a DNS nameserver authoritative to the "contentbroker" corresponds to an IP address of a DNS nameserver associated with the content broker 111. In one embodiment, the IP address is a specific network address unique to a DNS nameserver component of the content broker 111. In another embodiment, the IP address can be shared by one or more components of the content broker 111. In this embodiment, a further DNS query to the shared IP address utilizes a one-to-many network routing schema, such as anycast, such that a specific component of the content broker 111 will receive the request as a function of network topology. For example, in an anycast implementation, a DNS query issued by a client computing device 102A to a shared IP address will arrive at a DNS nameserver component of the content broker 111 logically having the shortest network topology distance, often referred to as network hops, from the client computing device. The network topology distance does not necessarily correspond to geographic distance. However, in some embodiments, the network topology distance can be inferred to be the shortest network distance between a client computing device 102A and a content broker component.

With continued reference to FIG. 3B, once one of the DNS nameservers in the content broker 111 receives the request, the receiving DNS nameserver attempts to resolve the request. The receiving DNS nameservers of the content broker 111 can be authoritative to resolve client computing device DNS queries corresponding to the registered domain names of the content broker 111. As similarly set forth above, a DNS nameserver is considered to be authoritative to a DNS query if the DNS nameserver can resolve the query by providing a responsive IP address. As will be explained in detail below, to resolve the DNS query, the content broker 111 can maintain request processing criteria, or requesting processing information, regarding the processing of requests for each resource, or a subset of resources, provided by the content provider 104. In an illustrative embodiment, the content broker 111 utilizes the request processing criteria to determine whether a subsequent request for the resource should be processed a network storage provider 110 or whether the subsequent request for the resource should be processed by a CDN service provider 106.

Illustratively, the request processing criteria can include the total number of requests obtained by the content broker 111 (measured directly or indirectly) for a resource over a defined period of time, trends regarding an increase/decrease in requests for the resource, a current financial cost associated with the delivery of the resource by the network storage provider, quality of service metrics measured by the network storage provider 110 or CDN service provider 106, additional criteria provided by the content provider 104, and various combinations or alternatives thereof.

In one illustrative embodiment, a specific DNS nameserver of the content broker 111 can resolve the DNS query by identifying an IP address of a service provider storage component, such as CDN resource cache components 124, 130, 136 or network storage provider storage component 140, 144, 148 (FIG. 1), that will further process the request for the requested resource. As described above, the selection of a service provider and the selection of an IP address of the selected service provider can be based, at least in part, as a function of the request processing criteria. Examples of the selection of a service provider and service provider storage components as a function of the request processing criteria will be described in detail with regard to FIG. 5.

As an alternative resolving the received DNS query by providing the IP addresses of a service provider storage component that will attempt to provide an embedded resource, the content broker 111 can maintain sets of various alternative resource identifiers based on service provider registration information received from the service providers, such as the CDN service provider 106 or the network storage provider 110. The alternative resource identifiers can be provided by the content broker 111 to the client computing device 102A such that a subsequent DNS query on the alternative resource identifier will resolve to a DNS nameserver component within a selected service provider's network. In this embodiment, a DNS nameserver associated with the content broker 111 (directly or indirectly) is able to receive the DNS query (corresponding to the domain in the embedded resource). However, as discussed above, because the DNS nameserver does not provide a responsive IP address to the query, it is not considered authoritative to the DNS query. Instead, the content broker 111 selects (or otherwise obtains) an alternative resource identifier that is intended to resolve to an appropriate DNS nameserver of a service provider (e.g., the CDN service provider 106 or the network storage provider 110) based on a variety of criteria. For example, the content broker 111 may select an alternative resource identifier associated with a service provider based on a regional service plan or service level information obtained from the content provider 104. As will be described further below, this additional information may also be used for further request routing.

In an illustrative embodiment, the alternative resource identifiers are in the form of one or more canonical name ("CNAME") records. In one embodiment, each CNAME record identifies a domain of the service provider (e.g., "serviceprovider.com" or "serviceprovider-1.com"). As will be explained in greater detail below, the domain in the CNAME does not need to be the same domain found in original URL. Additionally, each CNAME record includes additional information, such as request routing information, (e.g., "request routing information"). An illustrative CNAME record can have the form of:

request_routing_information.serviceprovider.com

The CNAME records are generated and provided by the one or more DNS nameservers of the content broker 111 to direct a more appropriate DNS nameserver of a service provider, such as a DNS nameserver of the CDN service provider 106 or the network storage provider 110. As used in accordance with the present disclosure, appropriateness can be defined in any manner by the content broker 111 for a variety of purposes. In a manner similar to the process described above, the selection of an alternative resource identifier (e.g., CNAME) corresponding to a selected service provider can be based, at least in part, as a function of the request processing criteria. Examples of the selection of a service provider as a function of the request processing criteria will be described in detail with regard to FIG. 5.

In accordance with this illustrative embodiment, the content broker 111 maintains a data store that defines CNAME records for various URLs corresponding to embedded resources. If a DNS query corresponding to a particular URL matches an entry in the data store, the content broker 111 returns a CNAME record to the client computing device 102A as defined in the data store and as illustrated in FIG. 4C. In an illustrative embodiment, the data store can include multiple CNAME records corresponding to a particular original URL. The multiple CNAME records would define a set of potential candidates that can be returned to the client computing device. In such an embodiment, the DNS nameserver of the content broker 111, either directly or via a network-based service, can implement additional logic in selecting an appropriate CNAME from a set of possible of CNAMEs.

The returned CNAME can also include request routing information that is different from or in addition to the information provided in the URL of the current DNS query. For example, if the CNAME selection is based on a regional service plan or a service level plan selected by the content provider 104, a specific identifier can be included in the "request_routing_information" portion of the specific CNAME record. In another embodiment, request routing information can be found in the identification of a service provider domain different from the domain found in the original URL. For example, if the CNAME is based on a regional plan, a specific regional plan domain (e.g., "serviceprovider-region1.com") could be used in the domain name portion of the specific CNAME record. Any additional request routing information can be prepended to the existing request routing information in the original URL such that the previous request routing information would not be lost (e.g., http://serviceplan.regionalplan.serviceprovider.com). One skilled in the relevant art will appreciate that additional or alternative techniques and/or combination of techniques may be used to include the additional request routing information in the CNAME record that is identified by the network storage provider 110.

Figure 4A:
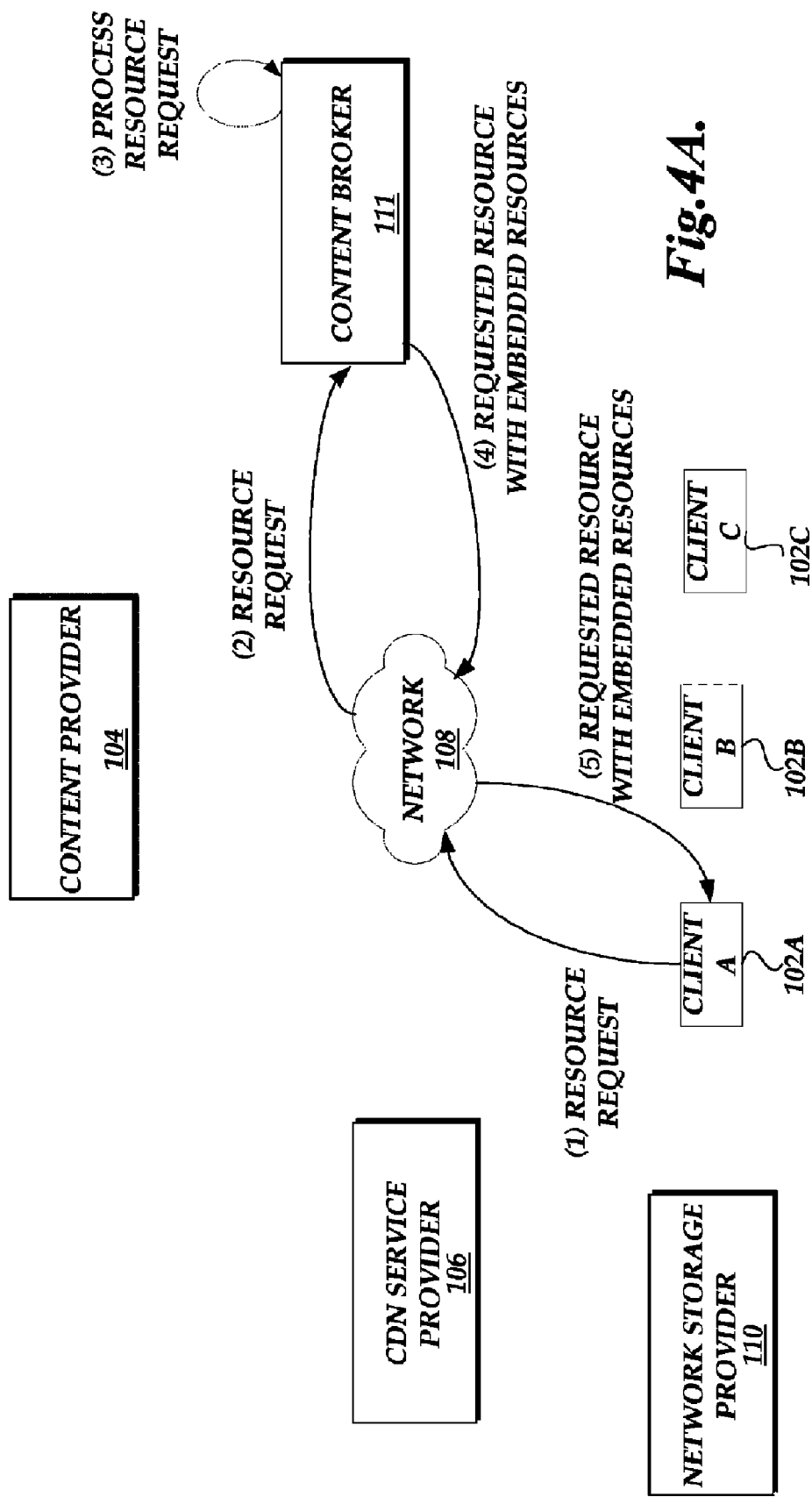
FIG. 4A is a block diagram of the content delivery environment of FIG. 1 illustrating the generation and processing of a resource request by a client computing device to a content broker.

With reference now to FIG. 4A, in another embodiment, the content broker 111 processes client DNS queries for the original content (e.g., Web page) instead of the content provider 104 as shown in FIG. 3A. In this embodiment, during registration with the content broker 111, the content provider 104 requests the content broker to host the original content or to process requests for the original content on its behalf in addition to facilitate the provision of embedded resources by a service provider. Once the content broker 111 manages the original content on behalf of the content provider 104, the content broker 111 can, in one embodiment, translate resource identifiers corresponding to one or more embedded resources so that client DNS queries for the embedded resources are also directed to the content broker 111. In an alternative embodiment, upon registering one or more embedded resources with a service provider, the content broker 111 may instead translate the embedded resource identifiers in the original content based on service provider registration information so that subsequent DNS queries for the embedded resources are processed by one or more service providers.

With continued reference to FIG. 4A, after completion of the registration and translation processes in accordance with this embodiment, a first client computing device 102A generates a content request that is received and processed by the content broker 111 on behalf of the content provider 104. In accordance with an illustrative embodiment, the request for the content can be in accordance with common network protocols, such as HTTP. Upon receipt of the content request, the content broker 111 identifies and transmits the appropriate responsive content to the client computing device 102A. In an illustrative embodiment, the requested content can correspond to a Web page that is displayed on the client computing device 102A via the processing of information, such as HTML, XML, and the like. The requested content can also include a number of embedded resource identifiers, described above, that corresponds to resource objects that should be obtained by the client computing device 102A as part of the processing of the requested content. The embedded resource identifiers can be generally referred to as original resource identifiers or original URLs.

Figure 4B:
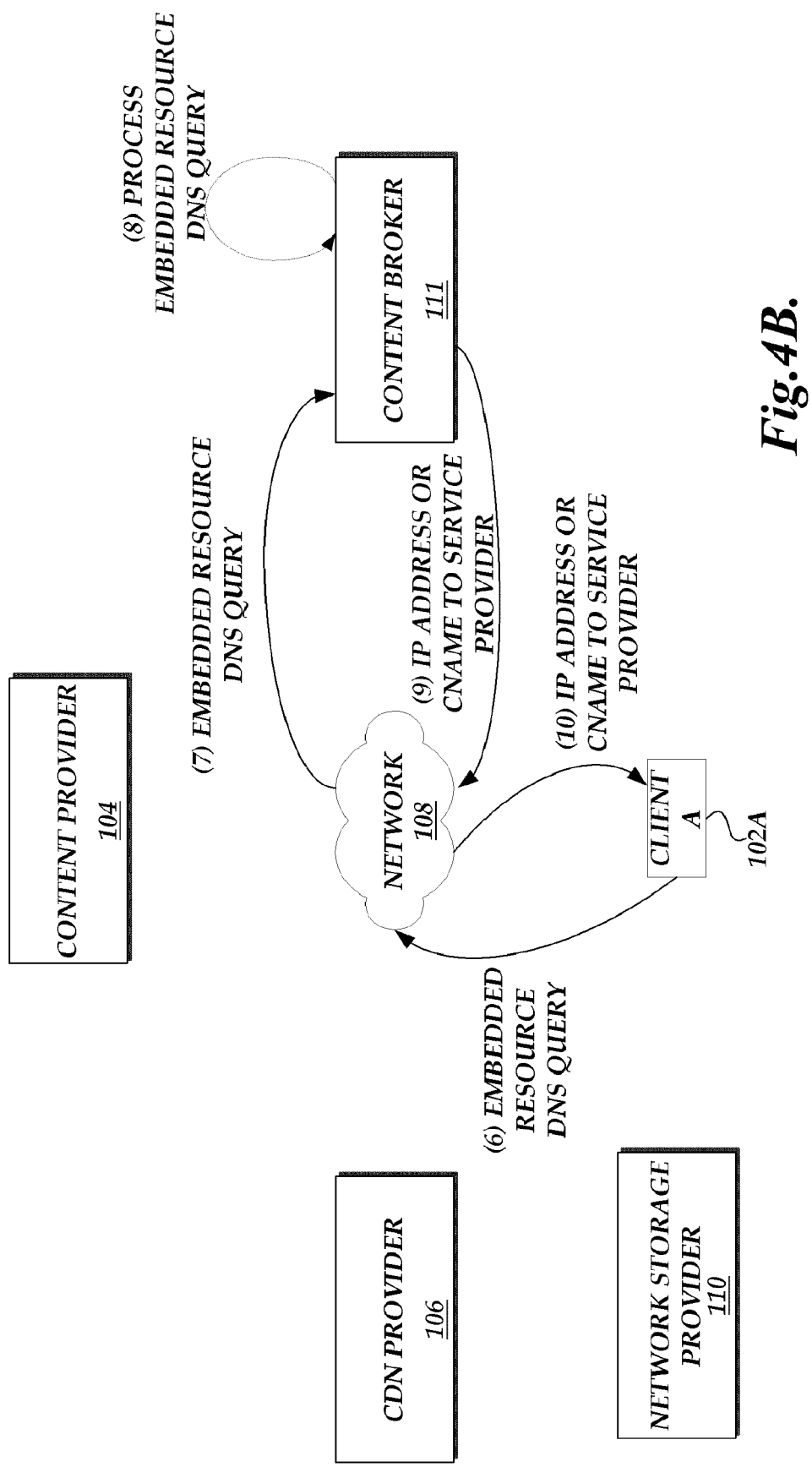
FIG. 4B is a block diagram of the content delivery environment of FIG. 1 illustrating the processing of a resource request by a content broker upon receiving the resource request from a client computing device.

With reference now to FIG. 4B, in accordance with the embodiment in which the embedded resource identifiers are associated with the content broker 111, the client computing device 102A then begins processing any of the markup code included in the content and attempts to acquire the resources identified by the embedded resource identifiers from the content broker 111. If the embedded resource identifiers correspond to domain associated with selected service provider, the client computing device 102A processes the embedded resources identifiers and transmits requests for the resources without further interaction by the content broker 111. Alternatively, if the embedded resource identifiers correspond to a domain name associated with the content broker 111, the client computing device 102A processes the embedded resource identifiers and transmits request for the resources to the applicable content broker domains. Further processing in this embodiment is identical to that described above in reference to FIG. 3B and accordingly will not be further described in reference to FIG. 4B.

Figure 5:
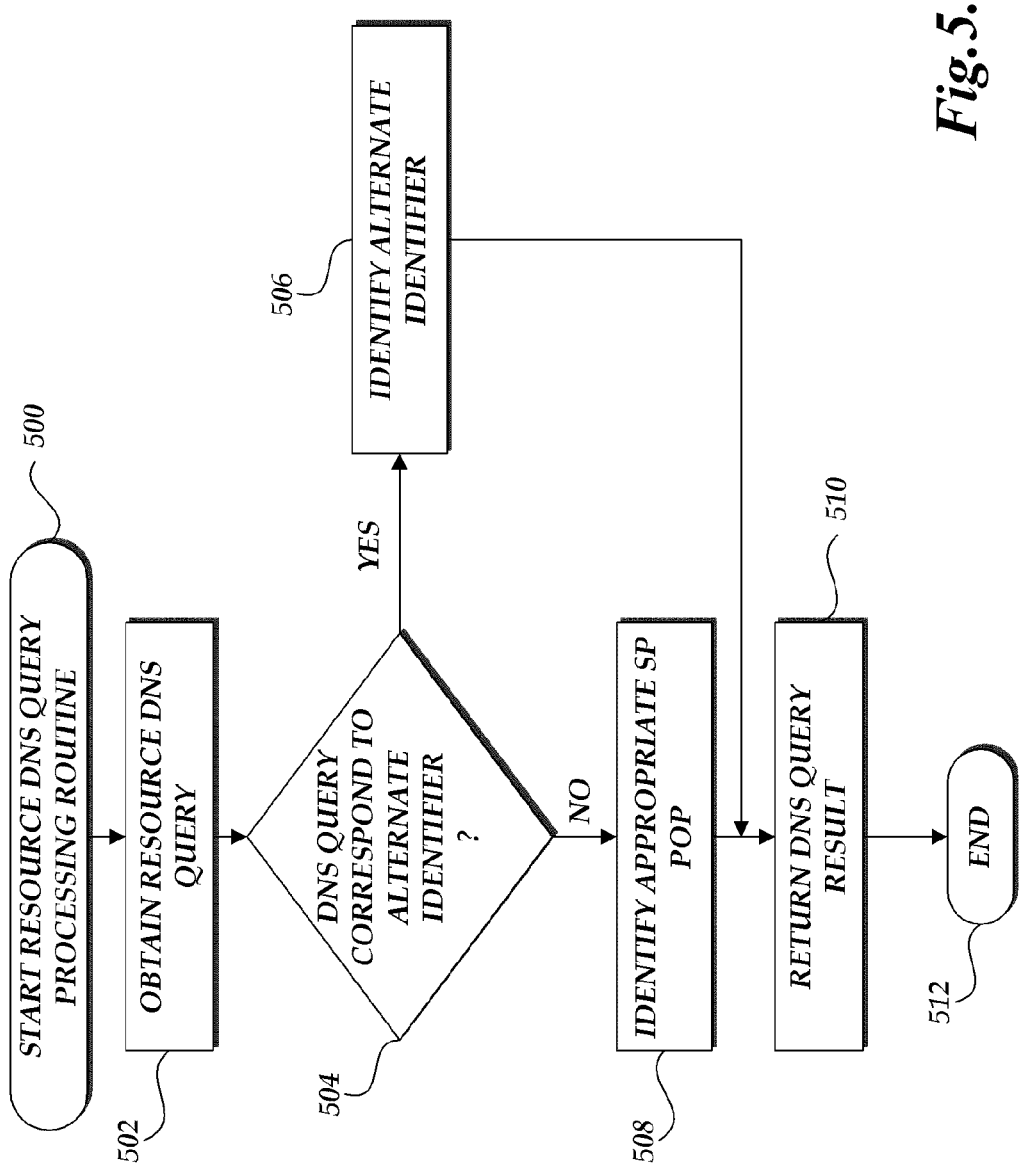
FIG. 5 is a flow diagram illustrative of a resource DNS query processing routine implemented by a content broker.

With reference now to FIG. 5, a flow diagram illustrative of a resource DNS query processing routine 500 implemented by a content broker 111 will be described. One skilled in the relevant art will appreciate that actions/steps outlined for routine 500 may be implemented by one or many computing devices/components that are associated with the content broker 111. Accordingly, routine 500 has been logically associated as being performed by the content broker 111.

At block 502, one of the DNS nameservers 150 of the content broker 111 receives a DNS query corresponding to resource identifier. As previously discussed, the resource identifier can be a URL that has been embedded in content requested by the client computing device 102 and previously provided by the content provider 104 (FIG. 3) or the content broker 111 (FIG. 4). At decision block 504, a test is conducted to determine whether the receiving DNS nameserver is authoritative to resolve the DNS query. In an illustrative embodiment, the receiving DNS nameserver can determine whether it is authoritative to resolve the DNS query if there are no CNAME records corresponding to the received resource identifier. As previously discussed, for purposes of the routine 500, a DNS nameserver component is considered to be authoritative to a DNS query if the DNS nameserver can resolve the query by providing a responsive an IP address of a service provider storage component, such as CDN resource cache components 124, 130, 136 or network storage provider storage component 140, 144, 148 (FIG. 1). In this context, the DNS nameserver may be operative to receive DNS queries on behalf network storage provider 110, but not authoritative if the DNS query cannot be completely resolved by providing a responsive IP address.

As previously described, to determine whether the DNS query can be resolved to an IP address of a service provider storage component, such as CDN resource cache components 124, 130, 136 or network storage provider storage component 140, 144, 148 (FIG. 1) or whether an alternate resource identifier should be provided, the receiving DNS nameserver utilizes request processing criteria to make such a determination. In an illustrative embodiment, the receiving DNS nameserver will utilize the cost information, at least in part, to make such a determination. The cost information corresponds to a financial cost attributable to the content provider 104 for the delivery of resources by the network storage provider 110 and the CDN service provider 106. The financial cost may be defined in a variety of ways and can be obtained by the SM component 152 of the content broker 111 in a variety of ways.

In one example, the cost information may designate that the content provider 104 has requested that the SM component 152 of the content broker 111 select the service provider (generally referred to as either the network storage provider 110 or a CDN service provider 106) associated with the lowest current financial cost to provide the requested resource. Accordingly, the SM component 152 of the content broker 111 could obtain cost information for at least a portion of the POPs and select the server provider (e.g., the network storage provider 110 or the CDN service provider 106) associated with the lowest financial cost. The financial cost information utilized to select the lowest financial costs may be based on a current financial costs or projected financial costs. The projected financial costs can be based on criteria, such as time of day, characteristics of the resource (e.g., size of the data, type of data, etc.), anticipated data throughput volumes, current loads experienced by each service provider, and the like. For example, if a service provider's POP resources are at an optimal capacity, the service provider may project financial cost at a premium cost level (e.g., a highest cost level) because any additional data traffic would cause the resources to operate above optimal rates. Conversely, the service provider may project lower financial costs for specific POPs according to historically known low volume times (e.g., time of day, days of the month, time of the year, special days/ holidays, etc.). The financial cost information may be a single cost projected for each identifiable service provider. Alternatively, the financial cost information may be a set of costs associated with one or more identifiable components of each service provider (e.g., financial information for one or more POPs associated with a service provider).

In another example, the cost information may designate the content provider 104 has requested that the cost associated with the providing the requested resource be maintained below one or more cost thresholds or cost tiers. Accordingly, the SM component 152 of the content broker 111 could obtain financial cost information for the available service providers and select only those service providers with a financial cost at or below the cost thresholds. The SM component 152 of the content broker 111 could then utilize other request processing criteria to select from the selected DNS nameserver (if more than one DNS nameserver is identified) or selected in accordance with other selections methodologies (e.g., random, round robin, etc.).

In another embodiment, the SM component 152 of the content broker 111 can utilize a determined/projected volume of request information for selecting a service provider. The determined/projected volume of request information can include the total number of requests obtained by the content broker 111 for a resource over a defined period of time, trends regarding an increase/decrease in requests for the resource, and various combinations or alternatives thereof. Alternatively, as will be described below, the SM component 152 of the content broker 111 can obtain information associated with received resource requests from corresponding network storage components 110 or CDN service providers 106 to obtain the determined/projected volume of request information. For example, the various network storage providers 110 and CDN service providers 106 can provide the content broker 111 with log files of received resource requests.

In a further embodiment, the SM component 152 of the content broker 111 can utilize geographic criteria for selecting a service provider. The geographic criteria can correspond to geographic-based regional service plans available between the service providers and the content provider 104. Accordingly, a client computing device 102 DNS query received in a region not corresponding to the content provider's regional plan may be better processed by a DNS nameserver in region corresponding to the content provider's regional plan. In this example, the SM component 152 of the content broker 111 also obtain geographic information from the client directly (such as information provided by the client computing device or ISP) or indirectly (such as inferred through a client computing device's IP address).

In yet another embodiment, the SM component 152 of the content broker 111 can utilize service level criteria for selecting a service provider. The service level criteria can correspond to service or performance metrics contracted between the available service providers and the content provider 104. Examples of performance metrics can include latencies of data transmission between the service provider POPs and the client computing devices 102, total data provided on behalf of the content provider 104 by the service provider POPs, error rates for data transmissions, and the like.

In still a further embodiment, the SM component 152 of the content broker 111 can utilize network performance criteria for selecting a service provider. The network performance criteria can correspond to measurements of network performance for transmitting data from the service provider POPs to the client computing device 102. Examples of network performance metrics can include network data transfer latencies (measured by the client computing device or the service providers, network data error rates, and the like.

In another embodiment, the SM component 152 of the content broker 111 can utilize content provider specified criteria for selecting a service provider. The content provider specified criteria can correspond to a variety of measurements or metrics specified by the content provider 104 and related to the delivery of resources on behalf of the content provider. The measurements or metrics can include content provider specified quality metrics (e.g., error rates), user complaints or error reports, and the like.

In accordance with an illustrative embodiment, the DNS nameserver maintains a data store that defines CNAME records for various URLs. If a DNS query corresponding to a particular URL matches an entry in the data store, the SM component 152 of the content broker 111 returns a CNAME record as defined in the data store. In an illustrative embodiment, the data store can include multiple CNAME records corresponding to a particular original URL. The multiple CNAME records would define a set of potential candidates that can be returned to the client computing device. In an illustrative embodiment, each the SM component 152 of the content broker 111 maintains the same data stores that define CNAME records, which can be managed centrally by the content broker 111. Alternatively, the content broker 111 can maintain separate copies of the CNAME records for distributed processing of DNS queries.

The returned CNAME can also include request routing information that is different from or in addition to the information provided in URL/CNAME of the current DNS query. For example, if the CNAME selection is based on regional plan, a specific regional plan can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, if the CNAME is based on regional plan, a specific regional plan domain (e.g., "cdnprovder-region1.com") could be used in the domain name portion of the specific CNAME record. Any additional request routing information can be prepended to the existing request routing information in the current URL/CNAME such that the previous request routing information would not be lost (e.g., serviceplan.regionalplan.cdnprovider.com). One skilled in the relevant art will appreciate that additional or alternative techniques and/or combination of techniques may be used to include the additional request routing information in the CNAME record that is selected by the SM component 152 of the content broker 111.

Alternative or additional methodologies may also be practiced to determine whether the DNS nameserver is authoritative.

If at decision block 504 the receiving DNS nameserver is not authoritative, at block 506, the DNS nameserver selects and transmits an alternative resource identifier. As described above, the DNS nameserver can utilize a data store to identify an appropriate CNAME as a function of the current DNS query. Additionally, the DNS nameserver component can also implement additional logical processing to select from a set of potential CNAMES. The routine 500 proceeds to block 510.

Alternatively, if the receiving DNS nameserver is authoritative (including a determination that the same DNS nameserver will be authoritative for subsequent DNS queries), the receiving DNS nameserver resolves the DNS query by identifying IP address of a service provider storage component, such as CDN resource cache components 124, 130, 136 or network storage provider storage component 140, 144, 148 (FIG. 1) at block 508. In a non-limiting manner, a number of methodologies for selecting an appropriate IP address have been previously discussed and may be utilized by the content broker 111.

At block 510, the receiving DNS nameserver returns the DNS query result to the requesting client computing device 102. As previously described, the DNS query result can include an identification of an IP address of a service provider storage component, such as CDN resource cache components 124, 130, 136 or network storage provider storage component 140, 144, 148 (FIG. 1) or a CNAME. At block 512, the routine 500 terminates.

As described above, the determination by the content broker 111 of whether to utilize a network storage provider 110 or a CDN service provider 106 can be automatically implemented by the processing of the DNS queries by the content broker 111. In an alternative embodiment, the content provider 104 (directly or through content broker 111) may translate the embedded resources to include a domain name of a selected network storage provider 110 or CDN service provider 106. An example of a content broker 111 translation of embedded resource identifiers was described with regard to FIG. 4B. Accordingly, in this embodiment, the content broker 111 would not necessarily receive the client computing device 102 DNS query corresponding to the embedded resources. However, the selection methodology discussed above with regard to decision block 504 (FIG. 5) can be utilized to make a recommendation to the content provider 104 to modify one or more of the embedded resource identifiers based on an updated recommendation from the content broker 111. In this embodiment, the SM component 152 of the content broker 111 would receive information corresponding to client computing device requests from the network storage providers 110, CDN service providers 106 or content provider 104.

In one embodiment, the content broker 111 recommendation regarding an implementation of a CDN server provider 106 or network storage provider 110 can be provided to the content provider 104 in accordance with APIs or graphical user interfaces. As previously described, the recommendation may be independently implemented by the content provider 104 as part of the translation of embedded resource identifiers. Additionally, the recommendation may be automatically authorized or otherwise implemented by the content broker 111, on behalf of the content provider 104, via the exchange of APIs, or other interfaces. As described above, the processing of the APIs may be accomplished without requiring additional human interaction.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing content requests comprising:
a data store operative to maintain request processing criteria corresponding to requested resources, the request processing criteria including at least one of financial cost information, quality of service information, volume of request information and content provider specified specific criteria; and
a storage management component operative to:
obtain a client computing device domain name system (DNS) query corresponding to one or more requested resources;
identify a network storage service provider and one or more content delivery network (CDN) service providers for providing a requested resource to a client computing device, wherein the network storage service provider and one or more content delivery network service providers are independent of the storage management component;
as a function of the request processing criteria, determine whether a subsequent request for the requested resource corresponding to the DNS query should be received by the identified network storage service provider or by the identified one or more CDN service providers, wherein the storage management component makes the determination by:

associating a financial cost with each of the identified network storage service provider and the identified one or more CDN service providers, wherein the financial cost corresponds to a financial cost attributed to a content provider for providing the requested resource corresponding to the DNS query by the identified network storage service provider and by the identified one or more CDN service providers respectively; and selecting at least one alternative resource identifier associated with at least one of the identified network storage service provider and the identified one or more CDN service providers based on a financial cost for providing the requested resource below a cost threshold; and in response to the DNS query, cause the return of the at least one alternative resource identifier.

2. The system as recited in claim 1, wherein the client computing device DNS query is associated with an embedded resource.

3. The system as recited in claim 1, wherein the volume of request information includes at least one of a total number of requests obtained from client computing devices for a resource over a defined period of time, trends regarding an increase in requests from client computing devices for the resource, and trends regarding a decrease in requests from client computing devices for the resource.

4. The system as recited in claim 1, wherein the storage management component is further operative to cause the registration of at least one of a network storage provider and a CDN service provider such that the at least one of a network storage provider and a CDN service provider will begin providing the requested resource.

5. The system as recited in claim 1, wherein the registration of the at least one of a network storage provider and a CDN service provider is completed automatically without requiring additional interaction from a content provider.

6. The system as recited in claim 1, wherein the alternative resource identifier corresponding to the selected one of a network storage service provider or CDN service provider corresponds to at least one of a network storage provider and a CDN service provider associated with a lowest financial cost for providing the requested resource.

7. The system as recited in claim 1, wherein selecting at least one alternative resource identifier associated with at least one of the identified network storage service provider and the identified one or more CDN service includes selecting at least one alternative resource identifier based on at least one of a characteristic of the content provider and a characteristic of the client computing device.

8. The system as recited in claim 1, wherein the storage management component is further operative to alternatively return an IP address associated with at least one of the identified network storage service provider and the identified one or more CDN service providers.

9. A method for managing resource requests comprising:
obtaining, by a storage management component, a domain name system (DNS) query from a client computing device, the DNS query corresponding to a resource maintained by a network storage provider on behalf of a content provider;

identifying, by the storage management component, a network storage service provider and one or more content delivery network (CDN) service providers for providing a requested resource to a client computing device, wherein the network storage service provider and one or more CDN service providers are independent of the storage management component;

associating, by the storage management component, a financial cost with each of the identified network storage service provider and the identified one or more CDN service providers, wherein the financial cost corresponds to a financial cost attributed to the content provider for providing the resource corresponding to the DNS query by the identified network storage service provider and by the identified one or more CDN service providers respectively;

selecting, by the storage management component, at least one of an IP address associated with the identified network storage service provider and an alternative resource identifier associated with one of the identified one or more CDN service providers based on a financial cost for providing the requested resource below a cost threshold and at least one other request routing criterion; and transmitting, by the storage management component, the selected one of the alternative resource identifiers associated with one of the identified one or more CDN service providers or the IP address associated with the identified network storage service provider.

10. The method as recited in claim 9, wherein the at least one other request routing criterion includes at least one of a total number of requests obtained from client computing devices for a resource over a defined period of time, trends regarding an increase in requests from client computing devices for the resource, and trends regarding a decrease in requests from client computing devices for the resource.

11. The method as recited in claim 9, wherein the request routing criterion includes cost information.

12. The method as recited in claim 11, wherein the cost information includes financial cost information attributable to the content provider.

13. The method as recited in claim 11, wherein the at least one other request routing criterion includes a lowest financial cost for providing the requested resource.

14. The method as recited in claim 9, wherein transmitting the alternative resource identifier associated with one of the identified one or more CDN service providers or the IP address associated with the identified network storage service provider includes:
identifying one or more service providers associated with a quality of service for providing the requested resource; and
selecting a service provider from the one or more service providers associated with a quality of service threshold.

15. The method as recited in claim 9, wherein transmitting the alternative resource identifier associated with one of the identified one or more CDN service provider providers or the IP address associated with the identified network storage service provider includes:
identifying one or more service providers associated with a content provider metric for providing the requested resource; and
selecting a service provider from the one or more service providers associated with a content provider metric threshold.

16. The method as recited in claim 9 further comprising causing the registration of the selected service provider such that the selected service provider will begin providing the requested resource.

17. The method as recited in claim 9, wherein the alternative resource identifier corresponds to a canonical name (CNAME).

18. A system for managing content requests comprising:
a data store operative to maintain request processing criteria corresponding to requested resources; and
a storage management component operative to:
- obtain information indicative of client computing device requests for a resource;
- update the request processing criteria maintained in the data store corresponding to the request for the resource;
- identify a network storage service provider and one or more content delivery network (CDN) service providers for providing the requested resource to a client computing device, wherein the network storage service provider and one or more content delivery network service providers are independent of the storage management component;
- associate a financial cost with each of the identified network storage service provider and the identified one or more CDN service providers, wherein the financial cost corresponds to a financial cost attributed to a content provider for providing the requested resource by the identified network storage service provider and by the identified one or more CDN service providers respectively;
- select at least one service provider from at least one of the of the identified network storage service provider and the identified one or more CDN service providers based on a financial cost for providing the requested resource below a cost threshold and at least one other request processing criterion; and
- generate a recommendation regarding the selected at least one service provider.

19. The system as recited in claim 18, wherein the client computing device request for the resource corresponds to a domain name system (DNS) query corresponding to an embedded resource.

20. The system as recited in claim 19, wherein a universal resource locator (URL) corresponding to the DNS query includes at least one field identifying the requested resource that can be identified during the processing of the DNS query.

21. The system as recited in claim 18, wherein the request processing criteria include at least one of a total number of requests obtained from client computing devices for a resource over a defined period of time, trends regarding an increase in requests from client computing devices for the resource, trends regarding a decrease in requests from client computing devices for the resource and a current financial cost associated with the delivery of the resource by a storage component.

22. The system as recited in claim 18, wherein the storage management component is further operative to cause the registration of a selected storage provider such that the selected service provider will begin providing the requested resource.

23. The system as recited in claim 18, wherein the registration of the selected service provider is completed automatically without requiring additional interaction from a content provider.

24. The system as recited in claim 18, wherein the storage management component is further operative to:
- obtain information indicative of subsequent client computing device requests for a resource;
- update the request processing criteria maintained in the data corresponding to the subsequent request for the resource;
- select a second service provider based at least on a financial cost for providing the requested resource below a cost threshold; and
- generate an alternative recommendation regarding the selected second service provider.

* * * * *